United States Patent [19]
Pease

[11] 3,736,373
[45] May 29, 1973

[54] CONDITIONAL VERTICAL SUBSAMPLING IN A VIDEO REDUNDANCY REDUCTION SYSTEM

[75] Inventor: Roger Fabian Wedgwood Pease, Holmdel, N.J.

[73] Assignee: Bell Telephone Laboratories, Incorporated, Murray Hills, N.J.

[22] Filed: Dec. 13, 1971

[21] Appl. No.: 206,991

[52] U.S. Cl...............178/6, 178/DIG. 3, 179/15 BW
[51] Int. Cl...............................................H04n 7/12
[58] Field of Search...................178/7.1, 6.8, DIG. 3, 178/5, 6; 325/38, 38 B; 179/15 BW

[56] References Cited

UNITED STATES PATENTS

| | | | |
|---|---|---|---|
| 2,921,124 | 1/1960 | Graham | 178/DIG. 3 |
| 2,732,424 | 1/1956 | Oliver | 178/5 |
| 3,553,361 | 1/1971 | Mounts | 171/6 |
| 2,681,385 | 6/1954 | Oliver | 178/DIG. 3 |
| 2,701,274 | 2/1955 | Oliver | 178/5 |
| 3,096,398 | 7/1963 | Gabor et al | 178/6.8 |

*Primary Examiner*—Richard Murray
*Assistant Examiner*—Joseph A. Orsino, Jr.
*Attorney*—W. L. Keefauver

[57] ABSTRACT

Alternate fields of a two-field interlaced video signal are transmitted without encoding from a transmitting encoder to a receiving location. In the encoder, a predicted value for each picture element in an in-between field is developed by spatially and temporally interpolating the amplitude values of picture elements in the fields preceding and following the in-between field. Each developed predicted value is compared with the actual picture element amplitude corresponding to that predicted value. If the difference between the two values is determined to exceed a threshold level, the difference is quantized and sent to the receiving location along with an address which properly locates the difference in the in-between field. In the receiver, an interpolated value is developed for each of the picture elements in the in-between field. If an error signal is received for any one of the picture elements, this error signal is added to the interpolated value.

11 Claims, 5 Drawing Figures

SIGNAL PROCESSING IN THE TRANSMITTER

FIG. 3

| FIELD NO. ON LINE 101 | V | A | B | C | D | E |
|---|---|---|---|---|---|---|
| 1 | 1 | 1 | | | | |
| 2 | 0 | 1 | 1 | 1 | $\bar{1}\cdot\bar{1}$ | 1 |
| 3 | 1 | 3 | 1 | 2 | $\bar{1}\cdot\bar{3}$ | $[2-(\bar{1}\cdot\bar{3})]_C$ |
| 4 | 0 | 3 | 3 | 3 | $\bar{3}\cdot\bar{3}$ | 3 |
| 5 | 1 | 5 | 3 | 4 | $\bar{3}\cdot\bar{5}$ | $[4-(\bar{3}\cdot\bar{5})]_C$ |
| 6 | 0 | 5 | 5 | 5 | $\bar{5}\cdot\bar{5}$ | 5 |
| 7 | 1 | 7 | 5 | 6 | $\bar{5}\cdot\bar{7}$ | $[6-(\bar{5}\cdot\bar{7})]_C$ |
| 8 | 0 | 7 | 7 | 7 | $\bar{7}\cdot\bar{7}$ | 7 |
| 9 | 1 | 9 | 7 | 8 | $\bar{7}\cdot\bar{9}$ | $[8-(\bar{7}\cdot\bar{9})]_C$ |
| 10 | 0 | 9 | 9 | 9 | $\bar{9}\cdot\bar{9}$ | 9 |

SIGNAL PROCESSING IN THE RECEIVER

FIG. 4

| E' | V' | F | G | H | I | J |
|---|---|---|---|---|---|---|
| 1 | 1 | | 1 | | | |
| $[2-(\bar{1}\cdot\bar{3})]_C$ | 0 | — | 1 | 1 | $(\bar{1}\cdot\bar{1})$ | 1 |
| 3 | 1 | $[2-(\bar{1}\cdot\bar{3})]_C$ | 3 | 1 | $(\bar{1}\cdot\bar{3})$ | $(\bar{1}\cdot\bar{3})+[2-(\bar{1}\cdot\bar{3})]_C$ |
| $[4-(\bar{3}\cdot\bar{5})]_C$ | 0 | — | 3 | 3 | $(\bar{3}\cdot\bar{3})$ | 3 |
| 5 | 1 | $[4-(\bar{3}\cdot\bar{5})]_C$ | 5 | 3 | $(\bar{3}\cdot\bar{5})$ | $(\bar{3}\cdot\bar{5})+[4-(\bar{3}\cdot\bar{5})]_C$ |
| $[6-(\bar{5}\cdot\bar{7})]_C$ | 0 | — | 5 | 5 | $(\bar{5}\cdot\bar{5})$ | 5 |
| 7 | 1 | $[6-(\bar{5}\cdot\bar{7})]_C$ | 7 | 5 | $(\bar{5}\cdot\bar{7})$ | $(\bar{5}\cdot\bar{7})+[6-(\bar{5}\cdot\bar{7})]_C$ |
| $[8-(\bar{7}\cdot\bar{9})]_C$ | 0 | — | 7 | 7 | $(\bar{7}\cdot\bar{7})$ | 7 |
| 9 | 1 | $[8-(\bar{7}\cdot\bar{9})]_C$ | 9 | 7 | $(\bar{7}\cdot\bar{9})$ | $(\bar{7}\cdot\bar{9})+[8-(\bar{7}\cdot\bar{9})]_C$ |

FIG. 5

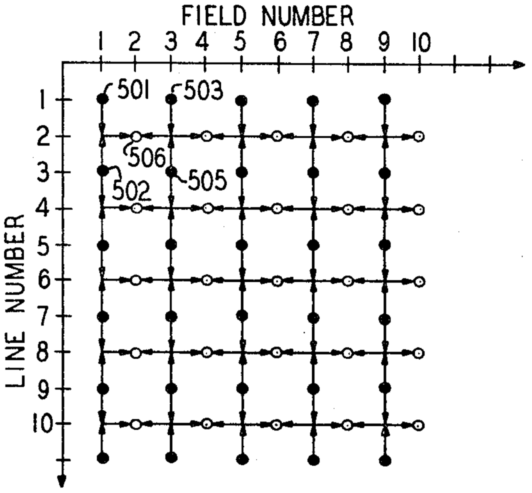

CONDITIONAL VERTICAL SUBSAMPLING IN A VIDEO REDUNDANCY REDUCTION SYSTEM

BACKGROUND OF THE INVENTION

This invention relates to redundancy reduction systems and, more particularly, to redundancy reduction systems used to process video signals.

In U.S. Pat. No. 3,571,505 of Mar. 16, 1971 to F. W. Mounts, a redundancy reduction system is described in which an entire frame of picture element amplitudes is stored in both the transmitting and receiving locations of a video encoding system. Each new picture element amplitude is compared with its corresponding amplitude stored in the encoder's frame memory and if the two amplitudes are determined to differ by more than a threshold level, the new amplitude is transmitted to the receiving location and, in addition, is used to replace the old amplitude stored in the frame memory. In this way, only those picture elements which encounter changes from one video frame to the next are transmitted between transmitting and receiving locations. Since the selection for transmission and replacement in the frame memories is a conditional one, these systems have been commonly referred to in the art as conditional replenishment video systems.

One technique which has been found to be particularly useful in further reducing the bit rate required in a conditional replenishment video system has been that of subsampling. In the article entitled "Transmitting Television as Clusters of Frame-to-Frame Differences" by J. C. Candy, Mrs. M. A. Franke, B. G. Haskell and F. W. Mounts, *The Bell System Technical Journal*, Vol. 50, July-August 1971, pages 1889 through 1917, a conditional replenishment video system is described in which rapid motion in the picture causes the frame-to-frame differences for every second picture element in the video line to be transmitted. In this way, advantage is taken of a psychological phenomenon in that more blurring of the picture is subjectively tolerable in cases where rapid motion is occurring. This technique of horizontal subsampling has proved to be particularly effective in a conditional replenishment system since during periods of fast motion conditional replenishment by itself tends to become uneconomical because so many picture elements are determined to change significantly from one frame to the next.

In my copending application with J. O. Limb entitled "Bandwidth Reduction System for Use With Video Signals," filed Dec. 11, 1970, Ser. No. 97,079, a bandwidth reduction system is described in which alternate frames of a two-field interlaced video signal are transmitted during the intervals when the picture is determined to be stationary. The picture element values for the in-between frames are established at the receiving location by temporally interpolating between the picture element amplitudes which are obtained from the adjacent video frames and which correspond to the same spatial point in the picture format. During periods of movement, alternate fields are transmitted to the receiving location and the picture element values for an in-between field are determined by both spatially and temporally interpolating the picture element amplitudes for the spatial points in the preceding and following fields above and below the spatial point under consideration. This system is also described in the article entitled "A Simple Interframe Coder for Video Telephony" by J. O. Limb and R. F. W. Pease, *The Bell System Technical Journal*, Vol. 50, July-August 1971, pages 1877 through 1888.

The technique of spatially and temporally interpolating even when utilized by itself during stationary pictures was found to yield a subjectively pleasing picture except in those instances where the picture contained edges having horizontal components. This technique is, of course, simply a specific method of obtaining vertical subsampling in bandwidth reduction systems utilized to process video signals.

SUMMARY OF THE INVENTION

A primary object of the present invention is to improve the subjective performance of a vertical subsampling system.

Another object of the present invention is to perform vertical subsampling in a system which may be integrated with a conditional replenishment video system.

These objects and others are achieved in the present invention, wherein the samples from a two-field interlaced video signal are separated into odd and even fields. The samples in the odd field are delayed and coupled without encoding to a transmission channel. Each picture element amplitude for an input sample in an odd field is algebraically combined with three other samples that have been delayed by intervals equal to one video line, one video frame, and one video frame plus one video line. These four samples represent the picture element amplitudes for two spatial points, one directly over the other, in two successive odd fields. The resulting algebraic combination yields a predicted value for the spatial point between the above-mentioned two spatial points in the odd field. The input samples from the even field are delayed by an interval at least equal to one field interval plus one-half line interval. Each delayed sample from the even field is compared with the predicted value corresponding to the same spatial point in the picture format. If the difference between the picture element amplitude in the even field and the predicted value is found to exceed a threshold level, this difference is quantized and coupled to the transmission channel along with an address word which locates that difference in the picture format. To maintain synchronism with the receiving location, a unique word is sent at the start of each odd field. To decrease the number of bits required for addressing, the first address word in each video line is transmitted whether or not its difference has exceeded the threshold level, and the address word only locates the difference word within the following line interval.

In the decoder, the received samples from the odd fields are delayed and combined in a fashion similar to the combination in the transmitting encoder in order to develop an interpolated value for each of the spatial points within the even field. This interpolated value in the receiver, as in the transmitter, represents a spatial and temporal interpolation of the spatial points above and below the spatial point under consideration in the even field. These interpolated values serve as the video amplitudes for most of the picture elements during the even field. If, however, a difference is received for a given spatial point in the even field, that difference is added to the interpolated value before the value is coupled to the output of the decoder.

BRIEF DESCRIPTION OF THE DRAWINGS

The invention will be more readily understood after reading the following detailed description in combination with the drawings in which:

FIGS. 3 and 4 show charts which illustrate the signal processing that takes place in the transmitting encoder and receiving decoder respectively; and FIG. 5 shows a graph which helps illustrate the type of predicted value developed in accordance with the present invention.

DETAILED DESCRIPTION

Figure 1:
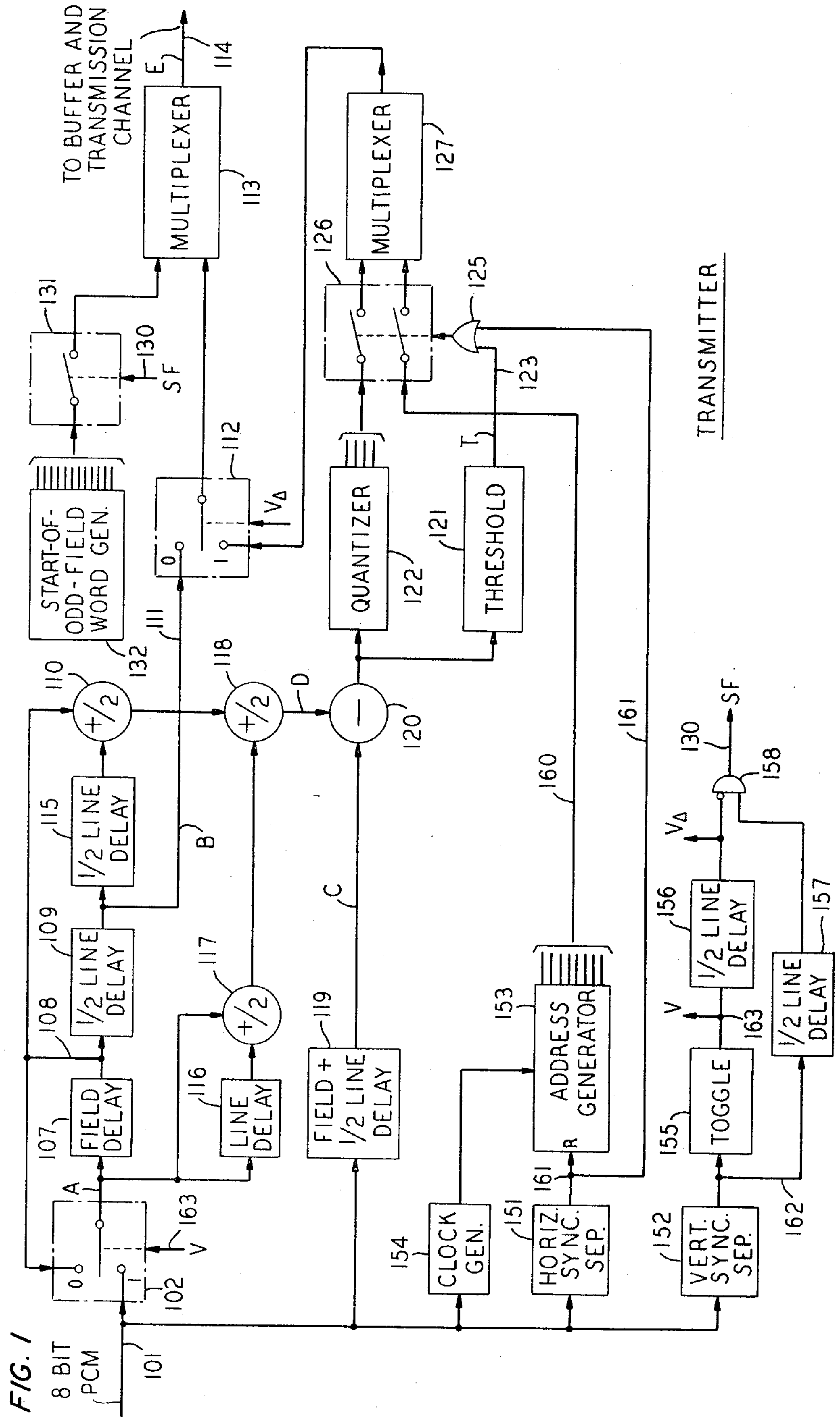
FIG. 1 shows a schematic block diagram of a transmitting encoder constructed in accordance with the present invention.

In FIG. 1, 8-bit digital words representing the picture element amplitudes at each of the spatial point locations in a picture format are coupled by way of line 101 to the input of a switching circuit 102. Each of these digital words are developed in a manner well known to those skilled in the art by sampling a video signal and coupling each sample through an analog-to-digital converter. The video signal utilized in the present invention is a signal of the standard type which results from scanning an image in the horizontal direction with successive lines separated by a horizontal blanking interval and each complete frame of scanning composed of two interlaced field intervals, each separated by a vertical blanking interval.

The digital words on line 101 are also coupled to the inputs of a clock generator 154, a horizontal sync separator 151 and a vertical sync separator 152. In response to each digital word, clock generator 154 couples an energizing pulse to the input of an address generator 153. This address generator 153 presents 8-bit digital words at its output on bus 160. The value of the digital word on bus 160 is increased by one in response to each energizing pulse from clock generator 154.

At the termination of each horizontal blanking interval in the video signal represented by the digital words on line 101, horizontal sync separator 151 provides an energizing pulse at its output on line 161. This energizing pulse is coupled to the reset input of address generator 153. In response to each pulse on line 161, address generator 153 is reset back to its zero position during which it provides a digital word with a logical 0 in each of the 8-bit positions on bus 160. This all-zero digital word corresponds to the address position for the first picture element in each video line.

Vertical sync separator 152 provides an energizing pulse on line 162 at the termination of each vertical blanking interval in the video signal on line 101. In response to this energizing pulse, a toggle circuit 155 changes the logical state of the signal provided at its output on line 163. Accordingly, toggle circuit 155 provides a square waveform which alternates logical states at the field rate of the video signal. In describing the operation of the present embodiment hereinafter, the fields during which the signal on line 163 provide a logical 1 will be designated as the odd fields, whereas the fields during which the waveform provides a logical 0 will be designated hereinafter as the even fields. This waveform on line 163 is designated in FIG. 1 and in the chart of FIG. 3 as waveform V.

Waveform V on line 163 is coupled to the control input of switching circuit 102. Switching circuit 102, like all other switching circuits to be described hereinafter, is actually constructed of a plurality of AND and OR gates. The precise configuration will depend on whether the input digital words are provided in a sequential or parallel bit format. These switching circuits are shown symbolically as simple single pole circuits in order to lend clarity to the drawings. In response to each logical 1 on line 163, switching circuit 102 connects the digital words on line 101 to the input of a field delay memory 107. Hence, each of the odd-numbered field intervals is coupled by switching circuit 102 into the field delay memory 107. The output of switching circuit 102, and hence the input of field delay memory 107, has been designated as point A in the drawings. To indicate what picture elements are present at point A during the various field intervals set forth in the first column of FIG. 3, the number of the field interval from which the picture elements have been derived is set forth in the column designated as A in FIG. 3. Hence, from FIG. 3, during field interval number 1 on line 101, the picture elements from field number 1 are also present at point A and, therefore, a number 1 is present in column A of FIG. 3 adjacent to field number 1. After a field interval, the digital words for these picture elements begin to emerge from the output of delay memory 107 on line 108. During this second field interval on line 101, the logical 0 present on line 163 causes switching circuit 102 to connect the input of field delay memory 107 through switching circuit 102 to line 108. Accordingly, the digital words for the picture elements in field number 1 are caused to reappear at point A during the field designated as number 2 on line 101.

The digital words on line 108 are also coupled to the input of a ½ line delay 109 and also to the input of an averaging circuit 110. The output of ½ line delay 109 is connected by way of line 111 to one input of a switching circuit 112. Switching circuit 112 has its control input connected to the output of a ½ line delay 156 whose input is connected to the V waveform on line 163. Hence, the control input of switching circuit 112 is provided by a waveform $V_\Delta$ which is identical to the V waveform but delayed for reasons given hereinafter by one-half video line. During the field interval designated as number 2 on line 101, the logical 0 present at the control input of switching circuit 112 causes that circuit to connect the digital words present on line 111 through to one input of a multiplexer circuit 113. Hence, during field number 2 on line 101, the digital words representing the picture element amplitudes from field number 1 are connected after a delay of one-half line through switching circuit 112 to the input of multiplexer circuit 113.

As will be apparent hereinafter, multiplexer circuit 113 only receives digital words at one of its two inputs during any given instant. The detection of the presence of digital words at one of the inputs causes multiplexer circuit 113 to couple these digital words through to a transmission channel 114. This transmission channel is designated as point E in FIG. 1 and by referring to the column designated as E in FIG. 3 it can be seen that the picture element amplitudes for field 1 are coupled onto transmission 114 during the interval when field number 2 is present on line 101.

As pointed out hereinabove, the digital words for the picture elements in field 1 are coupled back into the input of field delay memory 107 during field number 2 on line 101. Hence, when the digital words on line 101 for the picture elements of field number 3 begin to be coupled by way of switching circuit 102 into field delay memory 107, the digital words for the picture elements of field number 1 will begin to emerge from the output of delay memory 107 on line 108. After a further short delay of one-half line in delay 109, these picture element amplitudes are presented at point B on line 111. Hence, the circulation through field delay memory 107 provides a frame delay for each of the odd field picture elements. During field number 3 on line 101, however, switching circuit 112 is not coupled to line 111 and, therefore, the picture element values from field number 1 on line 111 are blocked from being coupled through circuit 112 to the input of multiplexer 113. These picture element amplitudes from field number 1 are coupled through a second ½ line delay 115 to a second input of averaging circuit 110. Averaging circuit 110, like other averaging circuits to be described hereinafter, is actually constructed of a two-input summation circuit followed by a circuit which divides by two. Since the total delay provided by delay 109 and delay 115 is equal to one video line time, averaging circuit 110 is provided with picture element amplitudes at its two inputs that correspond to two spatial points in the picture format that are vertically adjacent to each other in a single field.

The digital words present at point A are also coupled to the input of a line delay 116 and to one input of an averaging circuit 117, a second input of which is connected to the output of line delay 116. As a result, averaging circuit 117 also has presented to its inputs the picture element amplitudes for two spatial points that are vertically adjacent to each other in a field interval. During field number 3 on line 101, when the picture element amplitudes from this field are being coupled into field delay memory 107, the average values for the spatial points in field 3 are available at the output of averaging circuit 117. During this same instant, the average values for the picture element amplitudes from field number 1 are also available for the same two spatial points in the picture format at the output of averaging circuit 110. The outputs from averaging circuit 110 and averaging circuit 117 are combined in an averaging circuit 118 to provide a predicted value which represents the average of the picture element amplitudes present at two vertically adjacent spatial points during two successive odd field intervals. This value at the output of averaging circuit 118 developed by averaging values from fields 1 and 3 is presented in FIG. 3 as ($\overline{1 \cdot 3}$) in the column designated as D. As will be apparent hereinafter, digital words are also present at point D during the intervals when even fields are present on line 101 but these values are unimportant since they are not utilized by the circuits which follow. Hence, only during the intervals when the odd fields are present on line 101 are the values at point D of importance.

A better understanding of the type of value developed at point D can be gained by referring to FIG. 5. In this figure, a graph of line number versus field number is shown wherein odd-numbered fields contain only odd-numbered lines and even-numbered fields contain only even-numbered lines. Each darkened point in the graph represents a picture element in the video line of an odd field. The circles represent the predicted values developed from the picture element values in the odd fields. During the instant when picture element 501 and picture element 502 have their amplitudes being averaged in averaging circuit 110, picture elements 503 and 505 have their amplitudes being averaged in averaging circuit 117. The two resulting average values are then in turn averaged in averaging circuit 118 to yield the predicted value designated as 506 in FIG. 5. This value is, of course, presented at the output of averaging circuit 118 at point D.

All of the digital words on line 101 are also coupled to the input of a field + ½ line delay memory 119. This memory, as indicated by its title, imparts a delay equal to the duration of one field time plus the duration of one-half of a video line to the digital words on line 101. When picture elements from the third field interval are being presented on line 101, picture elements from the second field interval are being presented at point C, the output of memory 119. When a predicted value for one of the spatial points represented in FIG. 5 is present at point D, the actual picture element amplitude for this spatial point is simultaneously present at point C. These two amplitudes at points C and D are each coupled to one input of a subtraction circuit 120. The difference word developed at the output of circuit 120 is coupled to the input of a threshold circuit 121 and to the input of a quantizer 122 which assigns a 4-bit code word to represent one of 16 ranges of difference signal. If the magnitude of the difference word from subtraction 120 exceeds the threshold level within circuit 121, an energizing signal is developed on line 123. This energizing signal is coupled by way of line 123 to one input of an OR gate 125. The output of OR gate 125 is coupled to the control input of a switching circuit 126. Accordingly, if the difference word from circuit 120 exceeds the threshold level within circuit 121, OR gate 125 develops an energizing signal at the control input of switching circuit 126.

One input of switching circuit 126 is connected to receive the quantized difference code word from the output of quantizer 122. A second input of switching circuit 126 is connected to receive an address word from address generator 153. If OR gate 125 energizes the control input of switching circuit 126, both the quantized difference word and the address word from generator 153 are coupled to the inputs of a multiplexer 127. Multiplexer circuit 127 couples both the quantized difference word and its corresponding address word through switch 112 into multiplexer circuit 113 provided switch 112 is energized to its logical 1 state by the $V_\Delta$ waveform. Waveform $V_\Delta$ exhibits a logical 1 during the intervals when the even-numbered fields from line 101 are present at point C, the output of memory 119. Waveform $V_\Delta$ is derived by coupling waveform V through a ½ line delay 156. For the purpose of indicating signal processing in FIG. 3, waveform $V_\Delta$ can be considered substantially identical to waveform V. As indicated in FIG. 3, the interval when even-numbered fields are present at point C is the same as the interval when the interpolated value derived from the preceding and following odd fields is present at point D.

Multiplexer circuit 113 in turn couples both the address word and the quantized difference word to a buffer memory and transmission channel by way of line 114. The picture element amplitudes that are coupled onto line 114 are represented in column E of FIG. 3 by numbers which indicate the field intervals from which they have been derived. During the intervals when an odd field is being presented on line 101 at the input of the transmitting encoder, it is only the quantized difference words (and their corresponding address words) that may appear on line 114. Inasmuch as these words only appear when OR gate 125 energizes switching circuit 126, for example, when the difference between the predicted value and the actual value from the even field exceeds a threshold level, these words can be said to appear only on a conditional basis. Hence, the brackets in column E which indicate the manner in which these words have been derived are each provided with a subscript *c*.

Since the difference words and their corresponding address words only appear sporadically at point E, it is desirable to couple the digital words on line 114 into a buffer memory before they are transmitted over a channel having a constant bit rate. For this reason, the technique of vertical subsampling provided by the present invention can very easily be integrated into a conditional replenishment video system. As pointed out hereinabove, systems of this type also operate on a conditional basis and therefore must also have a buffer memory which couples the selected words to a constant bit rate channel. As will be apparent to those skilled in the art, the steady stream of picture element amplitudes provided on line 111 during the odd field intervals can easily be encoded prior to transmission by some prior art encoder such as a conditional replenishment video system.

As pointed out hereinabove, the address words generated by address generator 153 indicate the position of a video sample within a video line interval. Each clock pulse from clock generator 154 advances the address word on bus 160 by a value of one. During the termination of the horizontal blanking interval, the energizing pulse from horizontal sync separator 151 resets address generator 153 back to its zero position. This same energizing pulse which resets the address back to the zero position is coupled by way of line 161 to a second input of OR gate 125. As a result, the all-zero address word is coupled through to the buffer and transmission channel by way of line 114 whether or not the difference word corresponding to that address has produced an energizing signal at the output of threshold circuit 121. In this way, the first address word and its corresponding difference word permits the receiver to determine when a new video line has begun. Consequently, line synchronization can be maintained between the transmitting and receiving locations and the address word need only indicate the position of a difference word within a single video line.

Although the address generator 153 is triggered in response to the video samples present on line 101, the address digital words produced on bus 160 are equally applicable to the difference words quantized by the quantizer circuit 122. As is well known to those skilled in the video art, a field interval in a two-field interlaced video signal is equal in duration to an integral number of video lines plus one-half of a video line. Accordingly, the total amount of delay provided by the field + ½ line delay memory 119 is equal to an integral number of video lines. Hence, the difference word at the beginning of a video line is produced at the output of subtraction circuit 120 at the same instant as the first digital word of a video line is presented on line 101 and, therefore, the address words on bus 106 although triggered by the digital words on line 101 are equally applicable to the difference words from subtraction circuit 120.

In order to maintain field synchronization with a decoder in the receiving location, a distinguishable digital word is produced by a start-of-odd-field word generator 132. Because this word occurs where an address word might otherwise occur, the distinguishable word is caused to be a word corresponding to an address which the receiver knows to be nonexistent (e.g., No. 256 when there are only 255 addresses per line) and which therefore cannot occur during the conditional transmission of addresses. This distinguishable digital word is coupled to the buffer and transmission channel by way of line 114 at the beginning of each odd field interval. As will be apparent hereinafter, the decoder in the receiving location utilizes this distinguishable word to detect that the address words and difference words from the even field have ended and the next series of digital words will represent the amplitudes of the picture elements during an odd field interval.

The distinguishable word from generator 132 is coupled by way of switch 131 to the multiplexer circuit 113 when the control input of switch 131 is energized by a signal on line 130. The signal on line 130 is produced by an AND gate 158 which has one input connected to receive the energizing pulse out of vertical sync separator 152 after that pulse has been delayed by one-half of a video line in delay circuit 157. The delay provided in circuit 157 is necessary for the same reason the delay was provided in producing the $V_\Delta$ waveform. This is, of course, related to the fact that the input and output digital words of the transmitting encoder differ by an interval of one field plus one-half video line. An inhibit input of AND gate 158 is connected to receive the $V_\Delta$ 24 waveform. As pointed out hereinabove, the digital words for an odd field begin to be present at point B on line 111 a field interval plus one-half video line interval after they have been presented on line 101. During this interval, the $V_\Delta$ waveform presents a logical 0. Hence, only the vertical sync pulse out of delay 157 which occurs at the beginning of the odd field interval at point B is coupled through AND gate 158 to the control input of switch 131. The other sync pulse which occurs when the even field is present at point C is not coupled through AND gate 158 since the $V_\Delta$ waveform during this interval presents a logical 1 to the inhibit input of AND gate 158.

Figure 2:
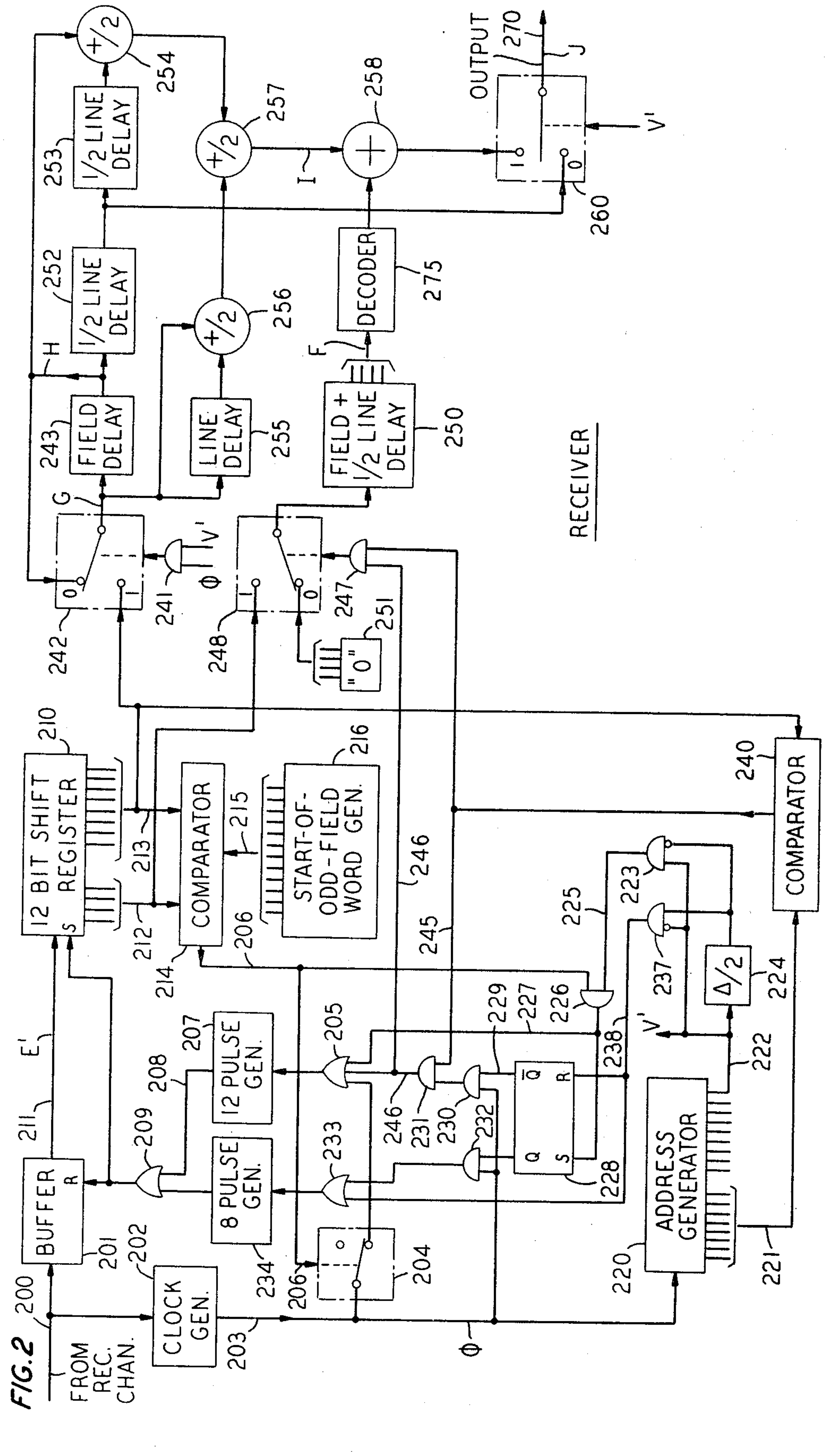
FIG. 2 shows a schematic block diagram of a receiving decoder constructed in accordance with the present invention.

The stream of digital bits coupled by way of line 114 to a buffer and a transmission channel are delivered from the receiving end of that transmission channel to a buffer memory 201 in FIG. 2. The digital bits of receiving channel 200 are also coupled to the input of a clock generator 202. In response to the digital bit rate on receiving channel 200, clock generator 202 delivers energizing pulses on line 203 at a rate identical to that of the energizing pulses provided at the output of clock generator 154 in FIG. 1.

The digital bit stream on channel 200 consists of a distinguishable 12-bit digital word indicating the start of an odd field followed by a plurality of 8-bit digital words, each one of which provides the picture element amplitude at a spatial point within the odd field, followed by a series of 12-bit digital words, each one of which includes an 8-bit address word followed by a 4-bit digital word whose value indicates the amplitude of the difference word corresponding to that address word. The number of bits contained in each of these digital words is, of course, in no way necessary in the practice of the present invention. For purposes of describing the operation of the decoder shown in FIG. 2, it will be assumed that the digital bit stream on channel 200 begins with the start-of-odd-field word generated in FIG. 1. Here again, the digital bit stream on channel 200 need not begin with that particular distinguishable word. Other means and methods of synchronizing digital bit streams between transmitting and receiving locations are well known to those skilled in the art.

Upon receiving the first digital bit on channel 200, clock generator 202 begins emitting the energizing pulses on line 203. Each energizing pulse on line 203 is initially coupled through a switch 204 to one input of an OR gate 205. Switch 204 is constructed in a way such that it will always assume the same initial closed-circuit state when the receiver is turned on and will remain in this state until an energizing signal is provided at its control input on line 206. At that time, switch 204 is open-circuited and remains in that state until the termination of the digital bit stream on channel 200.

Each energizing pulse coupled to the input of OR gate 205 is delivered to the trigger input of a 12-pulse generator 207. In response to each pulse at this trigger input, generator 207 produces 12 rapid pulses at its output on line 208. These pulses are short enough in duration relative to the time interval between pulses on line 203 such that all 12 pulses are delivered on line 208 before the generation of the next pulse on line 203. The twelve pulses on line 208 are coupled through an OR gate 209 to the read input of a buffer memory 201 and also to the shift input of a 12-bit shift register 210. In response to the 12 pulses, 12 digital bits are read out of buffer memory 201 on a first-in-first-out basis into shift register 210 by way of a line 211. The 12 digital bits present in the 12 cells of the shift register 210 are coupled by way of buses 212 and 213 to the input of a comparator circuit 214. Comparator circuit 214 is also connected by way of bus 215 to a start-of-odd-field word generator 216. This generator 216 develops a 12-bit digital word which is identical to the word developed by generator 132 in FIG. 1.

When the 12-bit digital word indicating the start of an odd field is coupled by way of buses 212 and 213 into comparator circuit 214, the latter circuit detects the presence of this distinguishable word within shift register 210 and in response thereto develops an energizing signal on line 206. This energizing signal, as indicated hereinabove, open-circuits switch 204. As a result, energizing pulses from clock generator 202 are no longer able to be coupled through this switch to the trigger input of 12-pulse generator 207.

Each energizing pulse on line 203 is also coupled to the input of an address generator 220. In response to each of these pulses, generator 220 increases the value of the digital word provided at its output. Generator 220 is simply a counter circuit which counts these pulses up to a value equal to the number of picture element samples contained in an entire video frame. At that point, generator 220 recycles back to its initial zero position and begins counting all over again. In addition, generator 220 is constructed such that the digital word provided at its outputs which are designated in the drawing as being coupled to bus 221 starts at zero for the beginning of each video line and recycles to zero at the beginning of the next video line. The most significant bit provided at the output of generator 220 is available on line 222. During one-half of the interval during which generator 220 is counting picture element samples in a video frame, this most significant bit is equal to a logical 0. During the other half of the video frame, this most significant bit is equal to a logical 1. Hence, the V' waveform available on line 222 alternates logical states at a rate equal to the field rate in the video signal.

The V' waveform on line 222 is coupled to one input of an AND gate 223. It is also coupled through a delay line 224 to an inhibit input of AND gate 223. Delay line 224 imparts a delay to the V' waveform equal in duration to one-half of the interval between the energizing pulses on line 203. When the V' waveform on line 222 changes from the logical 0 to the logical 1 state, AND gate 223 is energized for an interval equal to the delay provided by delay line 224. The resulting energizing pulse on line 225 is coupled to one input of an AND gate 226, the other input of which is connected to receive the output of comparator circuit 214. Accordingly, after comparator circuit 214 has detected that the start-of-odd-field word is present within shift register 210, the next initiation of the logical 1 state on line 222 in the V' waveform causes AND gate 226 to energize and thereby produce an energizing pulse on line 227. This energizing pulse is coupled both to an input of OR gate 205 and to the set input of the flip-flop 228. The energizing pulse coupled to OR gate 205 causes the production of 12 pulses on line 208, which shift out the 12-bit distinguishable word present in shift register 210 and replaces it with the next 12 bits from buffer memory 201.

Flip-flop 228 is constructed so as to initially present an energizing signal (logical 1) at its $\overline{Q}$ output on line 229. Hence, initially energizing pulses from line 203 are coupled through an AND gate 230 to one input of an AND gate 231. The resulting energizing signals at one input of AND gate 231, however, do not initially result in producing any energizing signal at the input of OR gate 205. The reason for this is apparent hereinafter in connection with the discussion of comparator circuit 240. In brief, no energizing of AND gate 231 takes place in this initial interval because the portion of the distinguishable start-of-odd-field word provided on bus 213 is not equal to any of the address words provided on bus 221 by address generator 220.

When the set input of flip-flop 228 is energized, thereby indicating that the start-of-odd-field word has been detected in shift register 210 and the V' waveform has begun its original 1 state, the resulting energizing signal at the Q output of flip-flop 228 causes one input of an AND gate 232 to be energized. A second input of AND gate 232 is connected to line 203 from the output of clock generator 202. Hence, when flip-flop 228 has been set, each clock pulse on line 203 is coupled through AND gate 232 to the input of an OR gate 233. Each time OR gate 233 is energized, the trigger input of an 8-pulse generator 234 is also energized and eight pulses are produced at the read input of buffer memory 201 and at the shift input of shift register 210.

With the V' waveform in its logical 1 state, the clock pulse on line 203 also energizes AND gate 241. AND gate 241, when energized, causes switch 242 to connect the 8-bit digital word on bus 213 through to point G at the input of a field delay memory 243. In this way, the 8-bit digital word on bus 213 representing the first picture element amplitude in the odd field is coupled into delay memory 243 and the resulting eight pulses from generator 234 cause an additional eight bits to be read out of buffer memory 201 into shift register 210. During the entire interval when a logical 1 is presented by the V' waveform on line 222, the 8-bit digital words representing picture element amplitudes on bus 213 are coupled into field delay memory 243 and new 8-bit digital words are coupled out of buffer memory 201 into shift register 210. In this way, all of the picture element amplitudes for the odd field interval are coupled into delay memory 243.

At the termination of the odd field interval, the V' waveform on line 222 changes from a logical 1 to a logical 0 state. This change causes AND gate 237 to produce an energizing pulse on line 238 equal in duration to the delay line 224. This energizing pulse on line 238 resets flip-flop 228 to the state where a logical 1 is presented at the $\bar{Q}$ output. In addition, the energizing pulse on line 238 is coupled through OR gate 233 to the trigger input of 8-pulse generator 234. This is to ensure that the eight digital bits in shift register 210 representing the last picture element amplitude in the odd field interval will be shifted out of shift register 210. Adequate energy might also be coupled through AND gate 232 to shift out these eight digital bits where flip-flop 228 is slow in its operation. The energizing signal on line 238 will simply overlap the energizing signal provided from AND gate 232 in those instances where a slow flip-flop is utilized as flip-flop 228.

With flip-flop 228 in its reset state, each clock pulse on line 203 is again permitted to pass through AND gate 230 to one input of AND gate 231. The second input of AND gate 231 is connected to the output of comparator circuit 240. One input of comparator circuit 240 is connected to receive the digital word on bus 221 which represents the address of the position in the video line presently being processed by the receiving apparatus. A second input of comparator circuit 240 is connected to receive the eight digital bits present on bus 213. As pointed out hereinabove, for the 12-bit digital words transmitted during the even field intervals, these eight bits on bus 213 represent the address of the difference word provided on bus 212. Only when the address word on bus 213 is identical to the address word on bus 221 will the comparator circuit 240 produce an energizing signal at its output on line 245. With an energizing signal on line 245, the clock pulse from line 203 is permitted to be coupled through AND gates 230 and 231 to an input of OR gate 205 by way of line 246. With energizing signals on both lines 245 and 246, AND gate 247 is energized causing switch 248 to couple the 4-bit digital word on bus 212 through to the input of a field + ½ line delay memory 250. During the instant when AND gate 247 does not energize switch 248, a 4-bit digital word having a logical 0 in each of its bit positions is coupled from a generator 251 through switch 248 into the delay memory 250. In logic circuitry where ground represents a logical 0, this generator 251 need only be a connection of each of these bit positions through to ground.

Each energizing pulse on line 246 is also coupled through OR gate 205 to the trigger input of 12-pulse generator 207. The twelve resulting pulses on line 208 cause twelve new digital bits to be read out of buffer memory 201 into shift register 210. The delay of 12-pulse generator 207 and duration of the clock pulse on line 246 are adjusted so that the four digital bits on bus 212 are coupled into delay memory 250 before the bits in shift register 210 are replaced with 12 new bits. These twelve new digital bits will remain in shift register 210 until a comparison is detected, by comparator circuit 240, between the address word on bus 213 and the address word on bus 221. At this instant, the four digital bits on bus 212 will again be coupled through switch 248 into the field + ½ line delay memory 250.

In summary, the 8-bit digital words from the odd field intervals are coupled through switch 242 to point G at the input of field delay memory 243 and the 4-bit digital words representing the difference words during the even field intervals are coupled at the appropriate time through switch 248 into delay memory 250.

The signal processing that takes place within the remainder of the receiving apparatus is illustrated in FIG. 4. In the first row of FIG. 4, the letters refer to the similarly designated points in the receiving apparatus of FIG. 2. The zeros and ones in the column designated as V' relate to the alternate logical states provided by the V' waveform on line 222. The remainder of the numbers in FIG. 4 refer to the fields from which picture elements have been derived. For example, in the first row of the column designated as E', the number 1 indicates that picture elements derived from a field number 1 are present on line 211 in FIG. 2 during the interval that the V' waveform presents a logical 1 on line 222. Each succeeding row in the chart of FIG. 4 relates to a succeeding field interval of time determined by the logical state in the V' waveform of line 222. During the first field interval after the start-of-odd-field word is presented in register 210, the picture elements from field number 1 are coupled through to point G as described hereinabove.

During the next field interval with the V' waveform in its logical 0 state, these picture elements emerge from field delay memory 243 at point H and are reinserted by way of point G into field delay memory 243. During this same field interval, any difference word that is present on bus 212 is inserted at the proper time by way of switch 248 into the field + ½ line delay memory 250.

During a third field interval, vertically adjacent picture elements from field number 1 are again provided at two inputs of averaging circuit 254. These elements are provided by coupling the picture elements at point H through a direct path to one input of averaging circuit 254 and to a second input through a second path consisting of ½ line delay 252 and ½ line delay 253 connected in tandem. In addition, during this third field interval, vertically adjacent elements from the third field interval are provided to the inputs of an averaging circuit 256 both by a direct connection through to point G and by way of a connection from point G through line delay 255. The outputs of averaging circuits 254 and 256 are in turn averaged in an averaging circuit 257 to provide an interpolated value at point I which has been derived by spatially and temporally interpolating the picture element values in fields numbered 1 and 3. Hence, processsing at point I during the interval when field number 3 is at point G is indicated in FIG. 4 by the designation ($\bar{1} \cdot \bar{3}$ ). Other values are, of course, present at point I during the intervals when the V' waveform exhibits a logical 0. These values do not in any way contribute to the output signal since switch 260 is only connected to the output of addition circuit 258 during the intervals when the V' waveform presents a logical 1.

If a difference word appears at point F, it is decoded by decoder 275 which assigns a binary value to each 4-bit code word representing a quantized difference. This quantized binary value of the difference is combined in the addition circuit 258 with the interpolated value from point I. This operation will result in producing a picture element value from an even field interval at the logical 1 input of a switch 260 which corresponds more closely to the original value than does the predicted value ($\overline{1\cdot3}$). If, instead, the all-zero digital word appears at point F, the interpolated value at point I is coupled without alteration in value through addition circuit 258 to the logical 1 input of switch 260. In this way, switch 260 is presented during the even field intervals with either an interpolated value from the preceding and following odd field intervals or with an interpolated value that has been modified by the difference word present at point F. Switch 260, in response to the V' waveform, connects tthe output line 270 to the output of ½ line delay 252 during the interval when a logical 0 is present in the V' waveform and to the output of addition circuit 258 during the intervals when a logical 1 is present in the V' waveform. As a result, an output video signal of the type which is indicated in column J of FIG. 4 is provided on output line 270. Picture element values from the odd fields appear on line 270 without alteration. During the even field intervals, an interpolated value is presented on line 270 and this interpolated value is modified by a difference word where the difference word has been received for the corresponding picture element.

The above-described apparatus is merely an illustrative embodiment of the present invention. Numerous modifications may be made by those skilled in the art without departing from the spirit and scope of the present invention. For example, other memory means may be utilized in place of the delay lines shown within FIGS. 1 and 2. In addition, other configurations of the delay line apparatus may be utilized in order to provide the picture element values for two vertically adjacent spatial points in the video signal. As in prior art video redundancy reduction systems, the threshold level in threshold circuit 121 may be a variable which is dependent on the level of fullness of the buffer memory associated with the transmitting channel.

I claim:

1. In a redundancy reduction transmitter for use with an encoded video signal having at least two field intervals interlaced to form a frame interval, the combination comprising first memory means for storing the picture element values from a first field interval, second memory means for storing picture element values from a second field interval, means for developing a predicted picture element value corresponding to each picture element value in said second field interval by spatially and temporally interpolating from picture element values stored in said first memory means and picture element values in a third field interval, means for comparing said predicted picture element value with its corresponding picture element value stored in said second memory means, means responsive to said comparing means for transmitting the difference between said predicted picture element value and said corresponding picture element value stored in said second memory means when the difference exceeds a predetermined threshold level.

2. Apparatus as defined in claim 1 wherein said second memory means includes a delay line having a delay equal at least to one field interval pulse one-half video line.

3. Apparatus as defined in claim 1 wherein said means for developing a predicted picture element value includes means for calculating a value in response to at least four input samples.

4. Apparatus as defined in claim 3 wherein said four input samples are picture element values from two vertically adjacent spatial points and said means for calculating a value is an averaging circuit.

5. In a television system having video lines arranged in a two-field interlaced frame, the combination comprising means for providing a succession of video samples; delay means responsive to said video samples for providing at each instant video samples delayed with relation to a given sample by one frame interval plus one video line, by one frame interval, by a field interval plus one-half video line, and by one video line interval; means for developing a predicted value by combining said given sample with the video samples delayed by one frame interval plus one video line, by one frame interval and by one video line interval; means for developing an error signal by comparing the predicted value with the video sample delayed by a field interval plus one-half video line; means for checking the error signal against a threshold level; and means for transmitting the error signal if it exceeds said threshold level.

6. Apparatus as defined in claim 5 wherein said delay means includes a field delay memory having an input and an output, and a single-pole double-throw type switching means for coupling the input of said field delay memory either to receive said succession of video samples or to receive the samples present at the output of said field delay memory.

7. Apparatus as defined in claim 5 wherein said means for developing a predicted value includes means for developing an average value of four input samples.

8. Redundancy reduction apparatus for use with input samples from a video signal having video lines from at least two field intervals interlaced to form a frame interval comprising means ffor delaying input samples by intervals of one video line, one field plus one-half video line, one frame, and one frame plus one video line; means responsive to said input samples for developing a waveform which alternates logical states at the field rate; means responsive to said waveform for coupling samples from alterante fields through to a transmission channel after they have been delayed in said delaying means for one field interval plus one-half video line; means for developing a predicted value in response to an input sample and samples which have been delayed by one video line, one frame, and one frame plus one video line; means for comparing each sample from a field in-between said alternate fields with said predicted value to develop an error signal; means for developing an address word which indicates the position of each predicted value in said in-between field; and means for coupling said error signal and its corresponding address word to said transmission channel if the error signal exceeds a threshold level.

9. Apparatus as defined in claim 8 wherein said means for delaying input samples includes a delay line having a delay equal to a field interval plus one-half video line, and a field delay line with an input switching means responsive to said waveform for connecting input samples through to said field delay line only during said alternate fields, the field delay line being coupled during the in-between fields through said switching means to its own output.

10. Apparatus as defined in claim 8 wherein said means for developing a predicted value includes means for averaging four input samples.

11. A method of reducing the redundancy in the data transmitted from a video signal having video lines from at least two field intervals interlaced to form a frame interval consisting of storing a sequence of samples from an interval at least as long as one frame plus one video line, developing a predicted value from the stored video samples corresponding to at least two vertically adjacent spatial points in two alternate field intervals, comparing said predicted value with a stored video sample from a field in-between said two alternate field intervals, and transmitting an error signal based on tthe comparison of said predicted value with said stored video sample from an in-between field.

* * * * *